Figure 1:
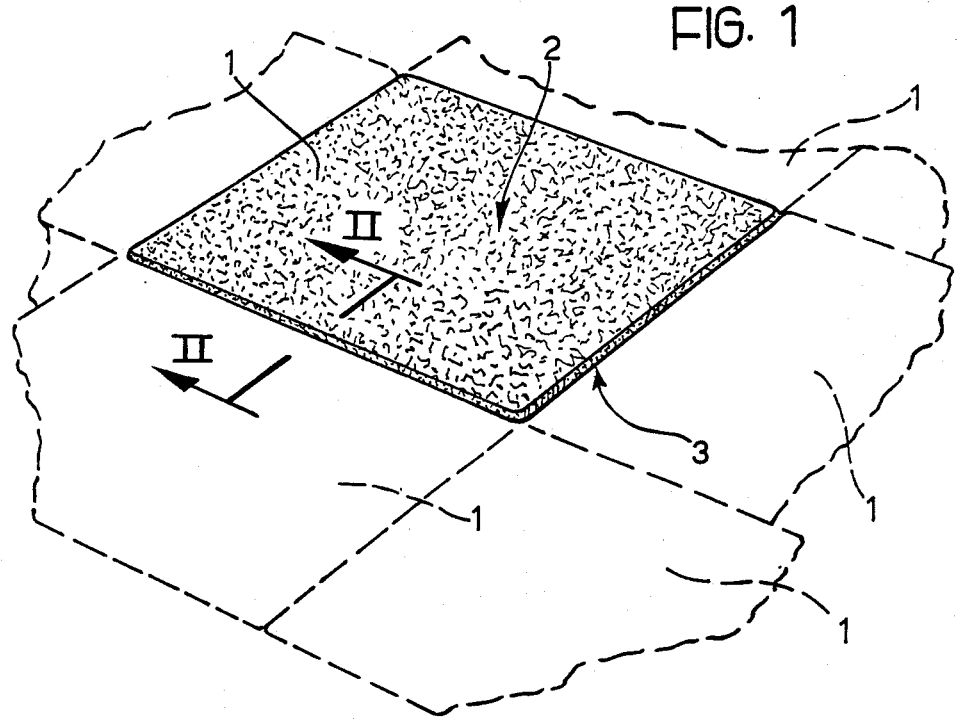

United States Patent [19]

Stroppiana

[11] Patent Number: 4,772,500
[45] Date of Patent: Sep. 20, 1988

[54] COVERING OF SYNTHETIC MATERIAL IN THE FORM OF TILES AND A METHOD FOR ITS MANUFACTURE

[75] Inventor: Fiorindo Stroppiana, Gallo D'Alba, Italy

[73] Assignee: Mondo Rubber S.p.A., Diano D'Alba, Italy

[21] Appl. No.: 864,859

[22] Filed: May 20, 1986

[30] Foreign Application Priority Data

May 20, 1985 [IT] Italy ................. 67463 A/85

[51] Int. Cl.$^4$ .................. B32B 3/10; B32B 3/02
[52] U.S. Cl. ............................ 428/46; 428/44; 428/81; 156/258
[58] Field of Search ............ 428/167, 172, 44, 46, 428/47, 48, 78, 79, 286, 318.6, 319.1, 95, 81; 156/270, 271, 258, 259

[56] References Cited

U.S. PATENT DOCUMENTS

| 1,774,736 | 9/1930 | Tomec | 428/172 X |
| 3,272,688 | 9/1966 | Holmstrom et al. | 428/318.6 |
| 4,010,301 | 3/1977 | Anderson et al. | 428/95 |

*Primary Examiner*—Alexander S. Thomas
*Attorney, Agent, or Firm*—Barnes & Thornburg

[57] ABSTRACT

A tile of synthetic material which simulates a hard surface is provided. The tile includes tapered peripheral edges which define rounded upper edges of the tile. The tile includes a core part which has two layers of substantially-inextensible, flexible, synthetic material between which is interposed an intermediate separating layer. A facing sheet simulating a hard surface tile is provided on the upper face of the tile. The facing sheet is applied to the core part and has rounded marginal portions which extend to cover marginal portions of the core part and define the rounded upper edges of the tile. The marginal portions of the facing sheet cover less than the total thickness of the core part.

25 Claims, 2 Drawing Sheets

COVERING OF SYNTHETIC MATERIAL IN THE FORM OF TILES AND A METHOD FOR ITS MANUFACTURE

The present invention relates to coverings of synthetic material.

Coverings (for walls or floors) of this type have been known for many years and are widely used in the building industry as an alternative to the traditional coverings of cement, marble or ceramic materials.

With respect to the latter, coverings of synthetic material—which generally have a layered, or sandwich, structure—have considerable advantages, particularly as regards lightness in weight, sound absorption and thermal insulation properties, the considerable ease of their application (which can be effected by simple gluing operations), and their ready adaptability to uneven application surfaces.

Traditional coverings—and particularly those of ceramics—continue to be widely used, however, and they tend to be preferred to coverings of synthetic material for making coverings with aesthetic qualities.

Coverings of synthetic material are currently made in the form of sheets, but they can also be made in the form of tiles, these being obtained by cutting. Such tiles resemble traditional coverings more closely in their aesthetic appearance, but they do have certain disadvantages which are related, essentially, to their lack of "body" (which tends to be considered a negative quality by the consumer) and to the relative ease with which they wear down at the edges, thereby necessitating replacement of the covering.

At least the first of these disadvantages can be overcome by attaching the synthetic tile to a firm core (for example, a wood panel). In this case, however, one of the most important advantages of synthetic coverings is lost, namely their ready adaptability to uneven application surfaces.

The object of the present invention is to provide a covering of synthetic material with a layered structure, which remedies the disadvantages pointed out above while retaining the intrinsic advantages of this type of covering.

According to the present invention, this object is achieved by a covering of synthetic material with a layered structure, characterised in that:

(a) the layered structure has a core part comprising two layers of substantially-inextensible, flexible synthetic material between which is interposed an intermediate separating layer, and (b) the covering is made in the form of tiles each of which has an upper face and a lower face and is delimited by tapered peripheral edges which define rounded upper edges on the upper face of the tile.

In this specification and in the claims which follow, the expression "substantially-inextensible", as applied to the materials constituting the outer layers of the core part of the layered structure, defines generally those flexible synthetic materials (preferably made in the form of knitted fabrics, non-woven fabrics, felts, etc. of glass or cellulose fibres or like fibres) which do not display any appreciable extension when subjected to the normal stresses applied to them in use in a wall or a floor covering.

The expression "separating layer", however, refers to any material (for example a polyvinyl chloride foam) which is sufficiently dense to keep the two outer layers of inextensible material effectively separate, preventing them from bearing on one another when the covering tile is bent.

By virtue of the characteristics set forth, the invention makes it possible to provide a covering of synthetic material in the form of tiles, the appearance of which (particularly as regards its body and the presence of the rounded corners on the upper surface) is substantially similar to that of ordinary ceramic tiles. At the same time, the covering according to the invention retains all the advantages (light weight, sound absorption, thermal insulation, ease of application, and adaptability to uneven application surfaces) characteristic of coverings of synthetic material. Moreover, the fact that each tile is delimited by tapered peripheral edges ensures that, at these edges, the layered structure of the covering is practically sealed from (or only marginally exposed to) the external environment. This sealing from the external environment becomes total when the covering according to the invention is applied in accordance with the criteria normally adopted in the application of ceramic coverings, in which the gaps between adjacent tiles are filled with adhesive or paste. This complete sealing from the external environment eliminates the phenomena or flaking and/or breakage at the edges of each tile which tends to occur with synthetic tile coverings currently in use.

Preferably, the aforesaid layers of flexible, synthetic material consist of sheets of fibre chosen from the group of glass fibres, cellulose fibres, polyester fibres, polyamide fibres, and combinations thereof.

In the presently-preferred embodiment, the intermediate separating layer consists substantially of polyvinyl chloride (PVC).

According to one particularly advantageous embodiment, the core part of each tile of the covering has marginal portions extending along the sides of the tile, and each tile includes, as its upper face, a facing sheet applied to the core part and having respective rounded marginal portions which extend so as to cover the marginal portions of the core part and define the rounded upper edges of the tile.

Preferably, the facing sheet includes a bottom layer of moulded plastics material and an upper core layer of transparent plastics material for protecting the tile against wear.

Between the bottom layer of the facing sheet and the core part there can usefully be interposed a further separating layer of dense plastics material.

According to the currently-preferred embodiment, each covering tile includes a bearing sheet on its lower face, the bearing sheet usually consisting of a material identical to that of the intermediate separating layer of the core part and having respective rounded marginal portions which extend in positions following the marginal portions of the core part.

In this way, the respective rounded marginal portions of the facing sheet and of the bearing sheet of each tile face one another.

The invention also relates to a method for manufacturing a covering of synthetic material with a layered structure having the aforementioned characteristics.

According to this method, the covering is made by hot-working as a continuous strip or sheet and subsequently subjected, under heat (preferably at a temperature of between 50° and 150° C., and even more preferably at a temperature of between 60° and 125° C.), to a drinking operation to form the rounded upper edges of the tiles, and to separate the individual tiles.

Preferably the drinking operation is carried out with knife-dinking tools having a cutting angle of the order of 50°.

Figure 2:
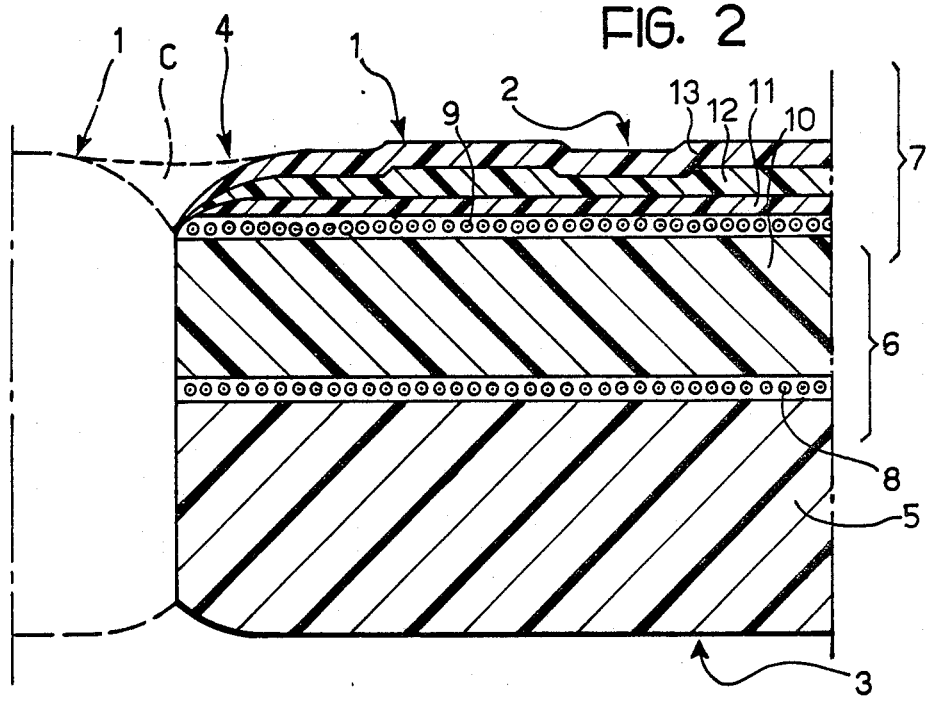
Figure 3:
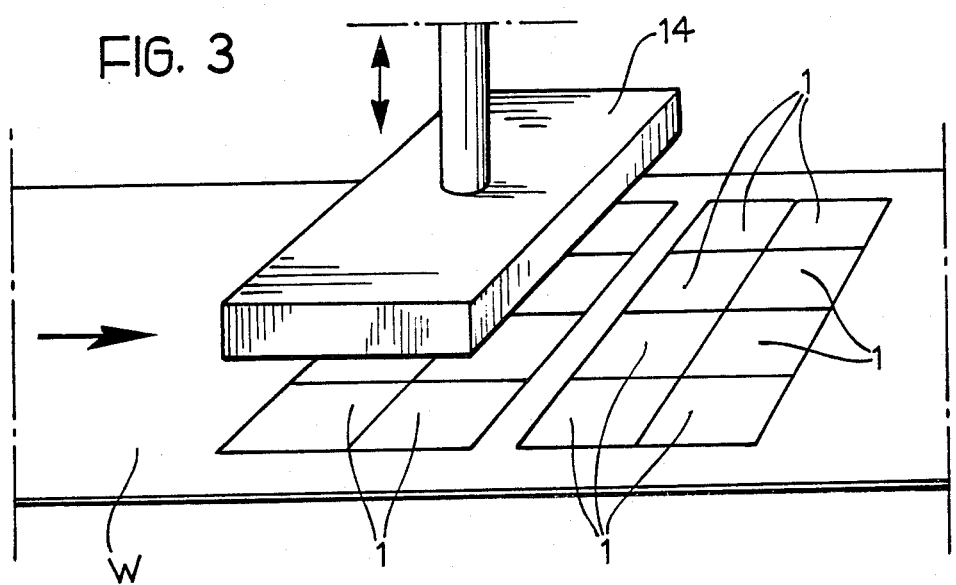
Figure 4:
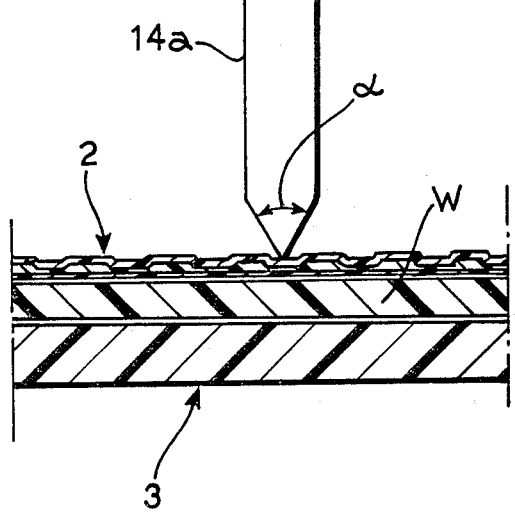
Figure 5:
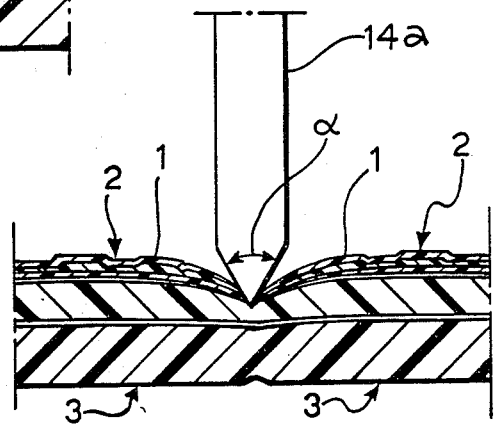

The invention will now be described, purely by way of non-limiting example, with reference to the appended drawings in which:

FIG. 1 is a perspective view of a tile of a covering of synthetic material according to the invention, FIG. 2 is a section taken on the line II—II of FIG. 1, showing the layered structure of the covering according to the invention in detail, and FIGS. 3 to 5 show diagrammatically the manner of carrying out the method for manufacturing the covering according to the invention.

In the drawings, a tile, generally indicated 1, constitutes, together with other identical tiles whose outlines are shown diagrammatically by broken lines, a covering applied to a flat surface such as the surface of a floor or wall.

The tiles 1 according to the invention can be applied by the normal methods used for applying ceramic tiles.

For example, they can be positioned on a base of mortar or of adhesive lime, or on a light coat of glue applied to the substrate.

An essential characteristic of the tiles according to the invention is that, unlike the tiles of normal coverings of synthetic material, they are delimited along the sides of their upper faces 2 by rounded edges, one of which is indicated 4 and is clearly visible in the sectioned view of FIG. 2.

For the sake of clarity, it is emphasised that, in this description and in the following claims, the terms "upper" and "lower", obviously dictated by the use of the covering according to the invention as a flooring material, are to be understood as referring, in general and respectively, to the face which is visible in the final, applied condition and to the face which, in this same condition, is applied to the covered substrate.

The presence of the rounded upper edges 4 means that, after application, the gaps between adjacent tiles can be filled with paste or glue (schematically shown at C in FIG. 2) in a manner entirely similar to that used in the laying of ceramic tiles.

The possibility of using sealant masses of paste or glue gives two notable advantages in use.

Firstly, the overall appearance of the finished covering is wholly similar to that of coverings of ceramic tiles. This makes the covering of synthetic material considerably more acceptable.

Secondly, on application of the sealant and by virtue of the presence of the rounded upper edges, the inner structure of each tile (which, as will be better seen below, is of a layered type) will be completely isolated from the external environment. Thus, there is a perceptible reduction in the possible wear and breakage of the sides of the tiles.

Passing now to a detailed description of the internal structure of the tiles 1, with reference to the sectional view of FIG. 2, it can be seen that each tile 1 of the covering has a layered, or sandwich, structure in which there can be distinguished primarily:
a bearing sheet 5,
a core part 6, and
a facing sheet 7.

The most important element of the structure of the covering according to the invention is the core part 6 which is intended to give the covering—and, more precisely, each tile 1—a certain rigidity or "body" while preserving the tile's characteristics of flexibility which allow it to adapt to substrates with uneven surfaces.

The core part 6 consists of three superposed layers.

The two outer layers, indicated 8 and 9, consist of two substantially-inextensible, flexible, fibre sheets while the intermediate layer, indicated 10, is a separating layer of relatively dense synthetic material, such as material consisting essentially of polyvinyl chloride.

For a more precise definition of what is meant by a "substantially inextensible" flexible layer and an intermediate "separating" layer, one is referred back to the introduction of the specification.

Several different possible choices exist for making the outer layers 8 and 9.

A first solution is to make these layers by using sheets of glass fibre having a weight of between 25 and 250 g/m$^2$ and preferably a weight of the order of 50-60 g/m$^2$. Other possible choices are to make the layers 8 and 9 in the form of sheets of cellulose fibre, polyester fibre, polyamide fibre, or combinations thereof, for example cellulose and polyester fibre.

The use of chemically or mechanically expanded polyvinyl chloride, with the usual addition of plasticisers, mineral fillers and stabilisers is the currently preferred choice for making the intermediate layer 10.

As explained above, the function of this layer is essentially that of separating the outer layers 8 and 9, effectively preventing them from settling on one another when the tile is bent.

The combination of two flexible, substantially-inextensible outer layers with a separating layer interposed between them gives the core part 6—and the tile 1 as a whole—characteristics of strength and flexibility which form an ideal compromise between the need to give the tile a certain body and the need to retain the possibility—characteristic of synthetic covering materials—of easy adaptability to uneven substrates.

Preferably, a polyvinyl chloride mass substantially identical to that employed for making the intermediate layer 10 of the core part is used for making the bearing sheet 5.

The facing sheet 7, whose structure can be said to be entirely known, can however be seen to comprise three superimposed layers, indicated 11, 12 and 13 respectively starting from the core part 6.

The layer 11 is essentially a reinforcing layer of dense polyvinyl chloride. Superimposed on it is a layer of expanded plastics material (typically polyvinyl chloride) which contains colourants and on which a geometric design, corresponding to the geometric design which it is desired to reproduce on the covering tiles 1, can be moulded, possibly in relief.

The layer 13 is essentially a wear layer of very strong, transparent polyvinyl chloride (or some other plastics material) whose function is to protect the coloured and possibly moulded layer 12 from wear, and particularly wear due to trampling.

The covering according to the invention is manufactured by a method comprising essentially two successive steps.

The first step provides for the manufacture of a continuous sheet or strip which has the layered structure shown in FIG. 1.

In other words, in this step, the various layers constituting the covering are superimposed on one another until they form the sandwich structure of the covering.

The criteria for carrying out this manufacturing step, which is structurally similar to that used in the manufacture of conventional types of synthetic coverings ("cushion floor"), are well known to technical experts in this field and will not, therefore, be described in detail.

It will suffice to remember that this operation is carried out under hot conditions, preferably in a continuous cycle, the material intended to constitute the bearing sheet 5 being spread initially on a support, the sheet which will constitute the first outer layer 8 of the core part 6 being immersed in this mass, and this sheet being subsequently covered by the material intended to constitute the intermediate layer 10. The sheet constituting the second outer layer 9 of the core part 6 is then immersed in the intermediate layer. The reinforcing layer 11, the coloured and possibly moulded layer 12, and the transparent wear layer 13 are then applied to the upper sheet.

By way of example, the thickness of the sandwich structure of the covering according to the invention is of the order of 3-4 mm. This thickness may vary, however, within wide limits according to the requirements of use.

It is emphasised particularly that, in the sectional view of FIG. 2, the relative proportions of the thicknesses of the various layers are not strictly accurate. By way of reference, with an overall thickness of the order of 4 mm, the bearing sheet 5 has a thickness of about 2 mm, while the intermediate layer 10 of the core part 6 has a thickness of about 1.35 mm. The overall thickness of the facing sheet 7 is of the order of 65 hundredths of a millimeter.

The second step in the method of manufacture of the covering according to the invention is aimed at enabling the separation of individual tiles.

For this purpose, while the covering (in the form of a continuous sheet or strip) is kept under hot conditions, typically at a temperature of between 50° and 150° C. (preferably between 60° and 125° C.), the sheet or strip is subjected to a dinking operation illustrated diagrammatically in FIG. 3.

In this drawing, the reference W generally indicates the sheet or strip which is moved forward in a horizontal direction to the delivery end of the line on which the sandwich structure is formed. The reference numeral 14, however, indicates a vertically-moving punch which is lowered rhythmically onto the upper face (that is the face to which the facing sheet 7 is applied) of the strip W to impress in the strip W the outline of the tiles 1 arranged in regular groups.

The punch 14 has cutting tools (blades) 14a which extend along paths corresponding to the paths it is wished to impart to the outlines of the tiles 1. Each blade 14a of the punch 14 normally has an overall cutting angle, in a plane perpendicular to the direction of greatest extension of the blade, of the order of 50°.

From what has been described above it is obvious that, by using punches 14 having blades extending along different paths depending on the applicational requirements, it is possible to produce, from a single type of continuous strip or sheet, a virtually unlimited number of different types of tiles, which can easily be adapted to different uses.

The purpose of the dinking operation is two-fold. Apart from serving, as already described above, to separate the individual tiles 1 (which can easily be separated from one another by a simple lifting operation carried out, for example, by a pick-up device with suckers), the dinking operation also enables the peripheral edges of the tiles 1 to be shaped and profiled.

The manner in which this takes place is illustrated diagrammatically in FIGS. 4 and 5 which illustrate the effect of the penetration of the dinking tool 14a (represented diagrammatically here in the form of a blade with a triangular profile having an angle of opening of about 50°) into the sandwich structure of the continuous covering sheet or strip W.

As described above, the dinking tool penetrates the sheet or strip of synthetic material from the face corresponding to the upper face 2 of the tiles.

As a result of the penetration of the dinking tool 14a, the synthetic covering material which emerges from the hot-moulding station and is kept at a temperature typically within a range of from 50° to 150° C., and preferably in the range 60° to 125° C., is subjected to plastic deformation. This deformation results in the formation of a rounded edge which defines the rounded edge 4 of the tile along each side of each tile 1 which is exposed to the action of the dinking tool 14a. As can be seen better in FIG. 2, the plastic deformation at the upper face 2 of the tile in fact corresponds to the formation of a curved marginal portion of the facing sheet 7 which extends so as to cover the respective marginal portion of the core part 6 and masks it from the outside.

A substantially similar phenomenon also occurs on the lower face 3 of the tile, which is not exposed directly to the action of the dinking tool. In this case also, rounded marginal areas are formed along the sides of the tile and extend so as to cover the inner parts of the tile.

Naturally, the phenomenon is less marked than the similar phenomenon which occur on the upper face 2. It can, essentially, be traced to an overall phenomenon of plastic deformation which manifests itself along the sides of the tile.

In each case, the overall result of the dinking operation is the formation, along the sides of each tile 1, of co-extensive marginal areas of the facing sheet 7 and of the bearing sheet 5.

These marginal areas thus mask and protect the internal structure of the tile 1, avoiding flaking of this area, which can quickly lead to deterioration of this tile and the consequent need to replace the covering.

As already indicated above, this masking action is completed when, after application, the gaps between the tiles 1 are filled with sealant masses of paste or glue.

Although the present invention has been described and illustrated in detail, it is to be clearly understood that the same is by way of illustration and example only, and is not to be taken by way of limitation. The spirit and scope of the present invention are to be limited only by the terms of the appended claims.

What I claim is:

1. A tile of synthetic material simulating a hard surface with a layered structure, comprising:

a tile having an upper face and a lower face and being delimited along its sides by tapered peripheral edges which define rounded upper edges on the upper face of the tile, the layered structure having a core part of a given thickness including two layers of substantially-inextensible, flexible, synthetic material, between which is interposed an intermediate separating layer, the core part having marginal portions extending along sides of the tile, and a facing sheet simulating a hard surface tile included at the upper face of the tile, the facing sheet being applied to the core part and having respective rounded marginal portions which extend so as to cover the marginal portions of the core part and define the rounded upper edges of the tile, the marginal portions of the facing sheet covering less than the total thickness of the core part.

2. A tile according to claim 1, wherein the two layers of substantially-inextensible, flexible, synthetic material consist of sheets of fibres.

3. A tile according to claim 2, wherein the fibres are chosen from the group consisting of: glass fibre, cellulose fibre, polyester fibre, polyamide fibre, and combinations thereof.

4. A tile according to claim 1 wherein the intermediate separating layer consists substantially of polyvinyl chloride.

5. A tile according to claim 1, wherein the facing sheet and a base layer of moulded plastics material and an upper wear layer of transparent plastics material.

6. A tile according to claim 5, wherein a reinforcing layer of dense plastics material is interposed between the base layer of the facing sheet and the core part.

7. A tile according to claim 1, wherein the tile includes a lower face bearing sheet applied to the core part, said lower face bearing sheet having respective rounded marginal portions which extend so as to cover lower marginal portions of the core part.

8. A tile according to claim 7, wherein the bearing sheet is constituted by a plastics material substantially identical to that which constitutes the intermediate separating layer of the core part.

9. A tile according to claim 1, wherein the facing sheet includes an upper transparent layer.

10. A tile according to claim 1, wherein said upper face simulating a hard surface tile simulates one of a group consisting of ceramic materials, cement and marble.

11. A tile as in claim 2, wherein the marginal portions of the core part extend over less than the total thickness of the core part.

12. A tile as in claim 1, wherein the marginal portions of the facing sheet cover only one of the two layers of substantially-inextensible, flexible, synthetic material.

13. A tile of synthetic material simulating a hard surface with a layered structure, comprising:

a covering made in the form of tiles, said tiles being arranged adjacent one another, each of said tiles including an upper face and a lower face and being delimited along its sides by tapered peripheral edges which define rounded upper edges on the upper face of the tile, each of said tiles including:

a layered structure having a core part of a given thickness including two layers of substantially-inextensible, flexible, synthetic material, between which is interposed an intermediate separating layer, the core part having marginal portions extending along sides of the tile, and a facing sheet simulating a hard surface tile included at the upper face of the tile, the facing sheet being applied to the core part and having respective rounded marginal portions which extend so as to cover the marginal portions of the core part and define the rounded upper edges of the tile, the marginal portions of the facing sheet covering less than the total thickness of the core part.

14. A covering according to claim 13, wherein the two layers of substantially-inextensible, flexible, synthetic material consist of sheets of fibres.

15. A covering according to claim 14, wherein the fibres are chosen from the group consisting of: glass fibre, cellulose fibre, polyester fibre, polyamide fibre, and combinations thereof.

16. A covering according to claim 13, wherein the intermediate separating layer consists substantially of polyvinyl chloride.

17. A covering according to claim 13, wherein the facing sheet has a base layer of molded plastics material and an upper wear layer of transparent plastics material.

18. A covering according to claim 17, wherein a reinforcing layer of dense plastics material is interposed between the base layer of the facing sheet and the core part.

19. A covering according to claim 13, wherein the tile includes a lower face bearing sheet applied to the core part, said lower face bearing sheet having respective rounded marginal portions which extend so as to cover lower marginal portions of the core part.

20. A covering according to claim 19, wherein the bearing sheet is constituted by a plastics material substantially identical to that which constitutes the intermediate separating layer of the core part.

21. A method of manufacturing a tile of synthetic material simulating a hard surface from a continuous sheet or strip, said continuous sheet or strip including:

a layered structure having a core part of a given thickness including two layers of substantially-inextensible, flexible, synthetic material, between which is interposed an intermediate separating layer, and a facing sheet simulating a hard surface tile included at an upper face of the continuous sheet or strip, said process comprising:

hot-working the continuous sheet or strip, and subjecting the hot-worked continuous sheet or strip to a dinking operation to form tiles each having an upper face and a lower face which is delimited along its sides by tapered peripheral edges which define rounded upper edges on the upper face of the tile and to form marginal portions of the core part extending along sides of the tile, and to form respective rounded marginal portions of the facing sheet which extend so as to cover the marginal portions of the core part and define the rounded upper edges of the tile, the marginal portions of the facing sheet covering less than the total thickness of the core part.

22. A method according to claim 21, wherein the dinking operation is carried out while the continuous sheet or strip is at a temperature substantially within the range 50° to 150° C.

23. A method according to claim 21, wherein the dinking operation is carried out while the continuous sheet or strip is at a temperature substantially within the range 60° to 125° C.

24. A method according to claim 21, wherein the dinking operation is carried out on that surface of the continuous sheet or strip intended to define the upper face of the tiles.

25. A method according to claim 21, wherein the dinking opration is carried out with bladed cutting tools having a cutting angle of the order of about 50° C.

* * * * *